United States Patent [19]
Paulson

[11] Patent Number: 6,112,319
[45] Date of Patent: Aug. 29, 2000

[54] METHOD AND SYSTEM FOR VERIFYING THE ACCURACY OF STORED DATA

[75] Inventor: Christopher Paulson, Cottage Grove, Minn.

[73] Assignee: Micron Electronics, Inc., Nampa, Id.

[21] Appl. No.: 09/027,411

[22] Filed: Feb. 20, 1998

[51] Int. Cl.[7] .................................................. H02H 3/05
[52] U.S. Cl. ........................ 714/49; 710/54; 714/42; 714/719
[58] Field of Search .................. 714/42, 49, 720, 714/777, 719, 40, 54, 43, 44, 747, 748; 710/54, 52, 4, 55, 57; 395/425; 711/113, 114; 712/14, 15; 709/213, 214

[56] References Cited

U.S. PATENT DOCUMENTS

| | | | |
|---|---|---|---|
| 4,074,230 | 2/1978 | Icenbice, Jr. ........................ | 714/777 |
| 4,410,944 | 10/1983 | Kronies ............................ | 364/200 |
| 4,559,626 | 12/1985 | Brown ............................. | 714/719 |
| 4,736,293 | 4/1988 | Patrick ............................ | 364/200 |
| 4,910,667 | 3/1990 | Tanaka et al. ..................... | 364/200 |
| 5,107,501 | 4/1992 | Zorian ............................. | 714/720 |
| 5,299,202 | 3/1994 | Vaillantcourt ...................... | 714/42 |
| 5,329,622 | 7/1994 | Belsan et al. ...................... | 395/250 |
| 5,392,412 | 2/1995 | Mckenna .......................... | 395/425 |
| 5,579,477 | 11/1996 | Ogletree .......................... | 714/44 |
| 5,845,318 | 12/1998 | Rose et al. ........................ | 711/113 |
| 5,881,221 | 3/1999 | Hoang et al. ...................... | 714/42 |
| 5,903,776 | 5/1999 | Larson ............................. | 710/54 |
| 5,931,926 | 8/1999 | Yeung et al. ....................... | 710/52 |
| 5,937,428 | 8/1999 | Jantz ............................... | 711/114 |

OTHER PUBLICATIONS

"Accelerated Graphics Port Interface Specification", Revision 1.0, Intel Corporation, Jul. 31, 1996.

Primary Examiner—Joseph E. Palys
Assistant Examiner—Rijue Mai
Attorney, Agent, or Firm—Dorsey & Whitney LLP

[57] ABSTRACT

A system for verifying the accuracy of stored data in a computer system where read and write requests can pass earlier-issued read and write requests. The system monitors read and write requests for a variety of data storage locations. When the system detects the first request to write data to a particular location it creates a data structure to represent that location and stores the data. For later write requests to the same location, the system modifies the data structure to store the new data being written, maintaining storage for only the data which can possibly be returned accurately for a read request. The system also monitors responses to read and write requests. For data returned in response to satisfaction of a read request, the system uses the data structure to determine if the returned data is accurate (i.e., if it is among the stored data). If the system determines that the returned data is inaccurate, it issues an error. The system can be used to test a computer device such as a video device using an Accelerated Graphics Port interface, or to monitor the normal operation of a computer system to ensure accuracy.

35 Claims, 10 Drawing Sheets

METHOD AND SYSTEM FOR VERIFYING THE ACCURACY OF STORED DATA

TECHNICAL FIELD

The present invention relates generally to verifying the accurate operation of a computer system, and more particularly to verifying the accuracy of stored data.

BACKGROUND OF THE INVENTION

A computer system can typically issue write requests which specify that particular data be stored on a particular storage medium at a particular location (e.g., in a memory location in a computer RAM), and read requests which specify that the data currently stored at a particular location on a particular storage device be retrieved and returned. It is often the case that a storage medium can only be written to by a single computer system. When a computer system retrieves data from a storage medium location to which only it has the ability to write, the retrieved data should be the same as the last data that was previously written to that location by the computer system.

Various situations, however, can cause retrieved data to be inaccurate. One such situation involves a problem with the storage location itself (e.g., a defect in a disk that causes bad sectors and corrupts the data stored there), or with the transmittal of the data (e.g., background noise on a transmission line that results in a 0 bit being mistakenly identified as a 1 bit). Alternatively, the satisfaction (i.e., processing and performance) of read and write requests can cause inaccuracy if requests are not satisfied in the order that they are issued. It is possible for a read or write request (i.e., a data request) that is issued later than another data request to be satisfied before the earlier-issued request, referred to as the later-issued request passing the earlier-issued request. If a read request passes an earlier write request to the same location, the data retrieved in satisfaction of the read request will reflect data that had previously been stored in the location instead of the data from the write request. Similarly, if a write request passes an earlier read request, then the data retrieved in satisfaction of the read request may be the data stored by the later write request.

Generally, a situation involving later requests passing earlier requests involves a design or manufacturing flaw in a computer system. During development, some computer systems may have design flaws that allow read requests to pass write requests. For example, many computer systems have a cache memory as well as a main memory, with the cache memory added to speed up the processing by the system. Cache memories are typically smaller than the main memory, but can operate more quickly. When the computer system receives a write request to a memory location in main memory, it is possible for the computer system to instead store the data temporarily in the cache before transferring it to main memory. However, if a later read request for the memory location in main memory is satisfied before the information is transferred from the cache, then the data returned for the read request will reflect data that was previously stored in that memory location. Thus, since the write request was not fully satisfied before the later read request was satisfied, the effect was that the read request passed the write request and retrieved inaccurate data. Various techniques have been used to prevent this problem, typically requiring that earlier write requests be fully performed before the satisfaction of the later read request can begin (e.g., requiring that the cache be flushed before read requests from main memory are satisfied).

Write requests which pass earlier read requests have rarely been a problem for computer systems. While highly unusual, however, it is possible for a computer system to have a flaw which would allow this to happen. For example, if both read and write requests are queued for satisfaction until a sufficient number of requests have accumulated, it is possible that a flaw could cause the computer system to inadvertently perform requests in an order other than the order of issuance. If so, a write request could pass a read request, with the data returned for a read request corresponding to data that was stored for a later-issued write request. Alternatively, if a computer system allowed requests to be issued with different priorities, a later-issued write request with a high priority could pass an earlier-issued read that was delayed due to its low priority.

In order to identify problems with later data requests that inadvertently pass earlier ones, computer manufacturers typically test computer systems before they are shipped, and many computer systems include diagnostic tests that are periodically performed during normal operation. One method of testing a data storage location is for the computer system to issue a series of read and write requests to the location and to verify that the data returned for the read requests corresponds to the last write request issued before the read. It is common to test main memory in this manner.

Recently, however, computer systems have been designed which intentionally allow data requests to pass earlier requests. For example, some personal computer systems use an interface which allows write requests from a video subsystem of the computer to pass earlier read requests from the video subsystem. Devices which use this interface, referred to as the Accelerated Graphics Port (AGP) interface, can access video data that is stored in the main memory of the computer system without the intervention of the computer system's CPU (for a description of the AGP interface, see the Accelerated Graphics Port Interface Specification, Revision 1.0, Jul. 31, 1996 from Intel Corp. In such a system where writes can pass reads, the data retrieved in satisfaction of a read request can accurately be the data from a write request issued before or after the read request, depending on whether a later write request is actually satisfied before the read request. This behavior can be desired for a variety of reasons. For example, some computer systems may need the most recent data that is available, and thus are willing to allow later write requests to pass earlier read requests. Alternately, if the returned data is only a small part of a rapidly changing display, such as a single pixel on a computer screen that is updated multiple times per second, the overhead associated with requiring that requests be processed in order may outweigh the minor problem of having an inaccurate pixel.

Although some computer systems may allow some data requests to pass other data requests, there are typically still some ordering requirements among data requests. For example, later read requests may not be allowed to pass earlier read requests and later write requests may not be allowed to pass earlier write requests. Since it is important that the ordering requirements are followed, it is necessary to test such computer systems in the same manner that other computer systems are tested. However, the testing of computer systems that allow some data requests to pass other data requests is much more difficult than in traditional computer systems that do not allow passing of requests. In particular, there is no longer a guarantee that the data returned for a read request will correspond to the last write request issued before the read.

Thus, computer systems which allow later-issued data requests to pass earlier-issued data requests, such as systems with a device using an AGP interface to store data in memory, can no longer use conventional memory testing techniques to test the memory or to test the operation of the device. If a write can pass a read, then the result of a read when testing memory could accurately be different data. Thus, the conventional memory technique that simply compares the result of a read to the previously issued write will no longer work.

SUMMARY OF THE INVENTION

Some embodiments of the present invention provide a method and system for verifying the accuracy of stored data in a computer system where read and write requests can pass earlier-issued read and write requests. The system monitors read and write requests for a variety of data storage locations, and records the possible data that can accurately be stored in the locations. When the system detects the first request to write data to a particular location, the system records that location and the data written to that location. For later write requests to the same location, the system records the new data and the order in which it was written. The system maintains only the data which can possibly be accurately returned for a read request. When the system detects a read request, the system records that the read request is pending. The system also monitors responses to read and write requests. For data returned in response to satisfaction of a read request, the system compares the returned data to the recorded data to determine if the returned data is accurate (i.e., any of the recorded data). If the system determines that the returned data is inaccurate, it issues an error. After detecting the satisfaction of a read or write request for a storage location, the system updates the recorded data to maintain only the data that remains possibly accurate for that location.

In one embodiment, the system is used to test a video device using an Accelerated Graphics Port interface. In this embodiment, the data being read and written is video data. In other embodiments, the system is used to verify the accurate workings of a computer system during regular operation of the computer system.

DETAILED DESCRIPTION OF THE INVENTION

Figure 1:
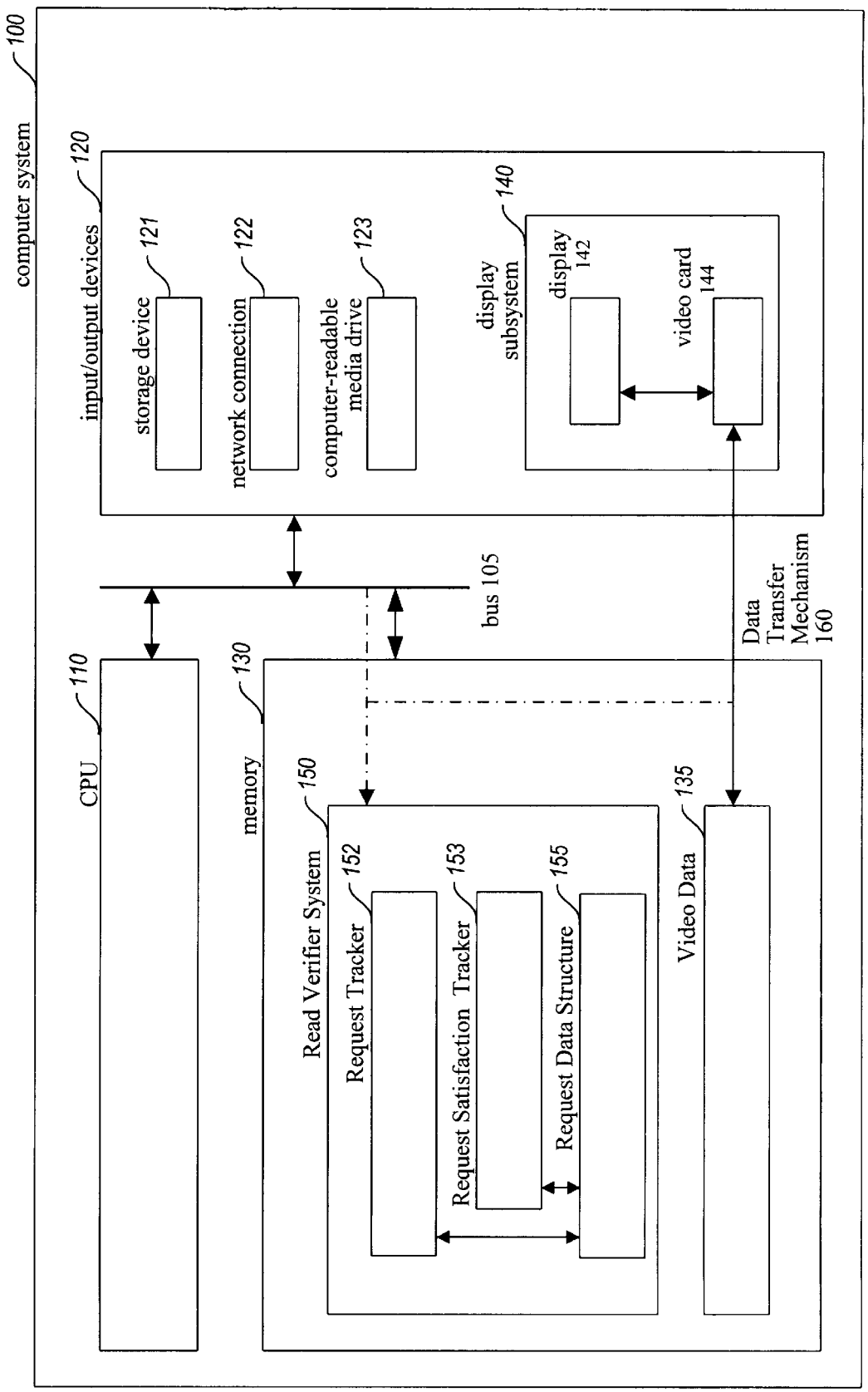
FIG. 1 is a block diagram of an implementation of the Read Verifier system of the present invention.

An embodiment of the present invention provides a method and system for verifying the accuracy of stored data in a computer system where later read and write requests (i.e., data requests) can pass (i.e., be performed before) earlier data requests. A Read Verifier ("RV") system of this embodiment verifies the accuracy of stored data in a computer system in which read requests can pass write requests and vice versa, but in which a read request cannot pass another read request and a write request cannot pass another write request. To verify the accuracy in such a computer system, the RV system monitors the read and write requests issued by a computer system, and maintains for each data storage location an ordered data list of the possible data that could accurately be returned in response to a read request to that location. When the RV system detects a write request to a location, the RV system adds the data from that write request to the data list for that location. When the RV system detects a response to a read request to a location, the RV system compares the returned data to the data in the data list for that location. If the returned data is equal to data in the data list, then the returned data is accurate. Otherwise, the RV system indicates that an error has occurred. If the returned data is accurate, the RV system removes from the data list all data from write requests that occurred before the write request which stored the returned data. Since one write request cannot pass another write request, the data from any of these earlier write requests can no longer be accurate. By removing the inaccurate data from the data list, the RV system ensures that the list contains only the data that could possibly be accurate for the next read request.

The RV system includes a Request Tracker and a Request Satisfaction Tracker. The Request Tracker monitors read and write requests for a variety of data storage locations. The Request Tracker modifies a data structure to represent the data being stored by write requests and to reflect read requests which are currently pending (i.e., have been issued but not yet satisfied). The Request Satisfaction Tracker monitors the satisfaction of requests. When a read request is satisfied, the Request Satisfaction Tracker checks the data structure to determine if the data returned in satisfaction of the read request corresponds to a previous write request. If the returned data does not correspond, it is not accurate and the Request Satisfaction Tracker indicates the inaccuracy.

To better understand the possible accurate return data for a read request in a computer system where requests must be processed in the order of issuance except that writes can pass reads, consider the following example where a series of data requests to a single memory location are issued in the order shown below. Before the first data request, the memory contains the value 0.

a first write request ("1w") to write the value 1, a first read ("1r") request, a second write request ("2w") to write the value 2, a second read request ("2f"), and a third write request ("3w") to write the value 3.

These data requests can be satisfied in any one of the five possible orderings shown in Table 1. For example, the fourth ordering "1w 1r 2w 3w 2r" indicates that the third write passes the second read. With such an ordering, the value returned for the first read is 1 and the value returned for the second read is 3. Since any one of these orderings are possible, first read could return a 1, 2, or 3, and the second read could return a 2 or 3. The second read could never accurately return a 1 since the second read cannot pass the second write, which overwrites the value 1 stored by the first write. However, once the value for the first read is known, the possible accurate values for the second read may be limited. In particular, if the first read returns a value of 3, then the third ordering has occurred and thus the only possible accurate value for the second read is 3.

TABLE 1

|   | Possible Orderings | Returned Values 1r | 2r |
|---|---|---|---|
| 1 | 1w 1r 2w 2r 3w | 1 | 2 |
| 2 | 1w 2w 1r 2r 3w | 2 | 2 |
| 3 | 1w 2w 3w 1r 2r | 3 | 3 |
| 4 | 1w 1r 2w 3w 2r | 1 | 3 |
| 5 | 1w 2w 1r 3w 2r | 2 | 3 |

In an alternate example with the same data requests, consider the situation where requests must be processed in the order of issuance except that reads can pass writes. These data requests can be satisfied in any one of the five possible orderings shown in Table 2. As Table 2 demonstrates, the first read could return a 0 or 1, and the second read could return a 0, 1, or 2. Thus, the simple test of writing data to a location and then comparing the data returned from a subsequent read to the written data cannot be used to verify the accurate operation of a system where later data requests can pass earlier data requests.

TABLE 2

|   | Possible Orderings | Returned Values 1r | 2r |
|---|---|---|---|
| 1 | 1w 1r 2w 2r 3w | 1 | 2 |
| 2 | 1r 1w 2w 2r 3w | 0 | 2 |
| 3 | 1r 2r 1w 2w 3w | 0 | 0 |
| 4 | 1w 1r 2r 2w 3w | 1 | 1 |
| 5 | 1r 1w 2r 2w 3w | 0 | 1 |

FIG. 1 illustrates a computer system 100 suitable for executing one embodiment of the present invention. The computer system 100 includes the CPU 110, the memory 130, the input/output devices 120, the bus 105, and the Data Transfer Mechanism (DTM) 160. The input/output devices include a storage device 121, a network connection 122, a computer-readable media drive 123, and a display subsystem 140. The display subsystem controls the display of information to a user of the computer system, and includes a display 142 and a video card 144. The video card can include its own memory and its own CPU, and with them it can act as a microcomputer. As the video card functions, it retrieves data and displays the data to a user of the computer system via the display 142.

The display subsystem, like the other input/output devices, can communicate with the memory via the bus. In addition, the display subsystem has access to the DTM, which is a separate connection between the video card and the video data that bypasses the normal data transfer mechanisms on the bus. The video card in the illustrated embodiment uses the DTM as part of an Accelerated Graphics Port (AGP) interface. In such a system, it is possible for the display subsystem to issue a read or write request via the normal bus mechanism to access a memory storage location in the portion of memory containing the video data. In addition, the display subsystem may also issue a read or write request via the DTM for the same memory location. Since it is possible for read requests which are transferred via the bus to be delayed or queued by the CPU before they are satisfied, a subsequent write request which is transferred via the DTM may be satisfied before an earlier read request transferred via the bus. Those skilled in the art will appreciate that the Data Transfer Mechanism can be implemented in a variety of ways. For example, there may be a physical connection between the display subsystem and the memory which is separate from the bus. Alternatively, the physical connection provided by the bus can be used to transfer the DTM requests, but a DTM request handling system can be provided that is different from the normal bus request mechanism (e.g., DTM write requests could have a higher priority than other requests).

In addition to the video data, the memory 130 also includes the Read Verifier (RV) system 150, comprising a request data structure 155, an executing Request Tracker 152 and an executing Request Satisfaction Tracker 153. The request data structure is maintained so that it contains the possible data which could be returned by the satisfaction of an accurate read request for memory locations containing the video data. As the display subsystem issues read and write requests to various video data memory locations, the Request Tracker detects the requests and modifies the request data structure to reflect the possible current contents of the memory locations. The data requests are monitored regardless of whether they travel via the bus or the DTM. When the detected request is a write request, the Request Tracker modifies the request data structure to store the data being written. When the Request Tracker detects a read request, the Request Tracker modifies the request data structure to reflect the order of the read request relative to the write requests. A more detailed description of a request data structure is described below in FIGS. 4A–4N.

The Request Satisfaction Tracker monitors the satisfaction of data requests by the computer system, and uses the request data structure to determine if the data requests are satisfied correctly. In particular, the Request Satisfaction Tracker detects the satisfaction of video data read requests, and compares the data returned for a read of a particular location with the possible contents of that location as represented by the request data structure. If the returned data does not match the represented contents for that location in the request data structure, the Request Satisfaction Tracker determines that the returned data is inaccurate and issues an error. After monitoring the satisfaction of a read request, the Request Satisfaction Tracker updates the request data structure so that it continues to store only the contents of the particular location that are still possibly accurate (e.g., if the request data structure indicates that the possible data includes data from write requests that occurred before the write request to which the returned data corresponds, then this earlier data should be removed as it is no longer accurate data for the next read request). If the Request Satisfaction Tracker detects the satisfaction of a write request, it updates the request data structure to reflect that information. A more detailed description of a request data structure is described below in FIGS. 4A–4N.

Those skilled in the art will appreciate that computer system 100 is merely illustrative. Thus, the computer system 100 may contain additional components or may lack some illustrated components, and computer system 100 may be connected to other devices such as other computer systems or other storage devices. In addition, data requests can be issued by another computer system or computer subsystem rather than by the display subsystem. Accordingly, the present invention may be practiced with other computer system configurations.

Figure 2:
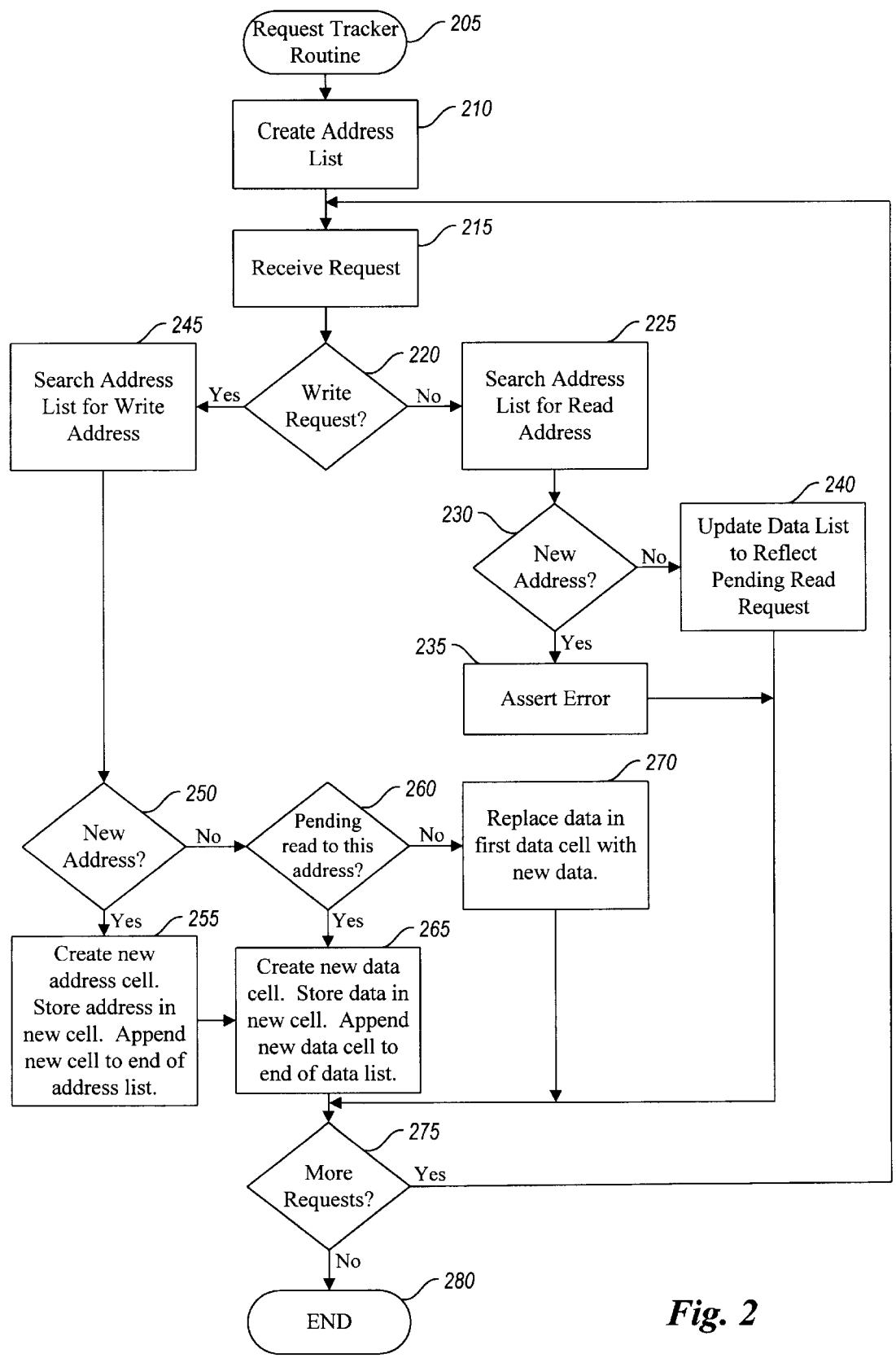
FIG. 2 is a flow diagram of an implementation of the Request Tracker routine.

FIG. 2 is a flow diagram for an implementation of the Request Tracker routine 205. The Request Tracker routine monitors read and write requests, and maintains a request data structure which contains the possible data which could be returned by the satisfaction of an accurate read request. In the illustrated embodiment, data will be stored in and retrieved from memory locations which each have a unique memory address. The request data structure will consist of a linked list of address cells. Each address cell represents a particular memory location for which a write request has been received, and it contains a linked list of data cells (i.e., a data list) which represents some of the write requests to store data to that memory location. In addition, write requests can pass read requests in the illustrated embodiment, but a read request cannot pass a write request or another read request and one write request cannot pass another write request. As the Request Tracker routine operates it loops, receiving read and write requests. For each read request, the routine verifies that the read address is accurate, and if so it updates the corresponding address cell and its data list to reflect a pending read request. For each write request, the routine creates a new address cell if one does not yet exist for the address, and stores the data to be written in either a new or existing data cell for the address.

The routine begins at step 210 where it creates an address list in which to store data request information. In other embodiments, a data structure may already exist which can be used, and if so the routine could skip this creating step. In step 215 the routine receives an indication that a request has occurred, and in step 220 it determines whether the request is a write request or a read request. If step 220 determines that the indicated request is a write request, the routine continues to step 245 to search the address list for an address cell representing the write address. If it is determined in step 250 that the address is a new address (i.e., no existing address cell was found), the routine continues to step 255 where it creates a new address cell to represent the memory address and then stores the write address in the new address cell. The new address cell is then appended to the end of the address list. One skilled in the art will appreciate that many well-known techniques, such as indexing and sorting, may be used to speed access to the address list. If step 250 determines that the write address is not a new address, the routine continues to step 260 where it is determined if there is a pending read for this address. If there is not a pending read, the routine continues to step 270 where it retrieves the first data cell in the data list for the address cell (once an address cell is created, there will always be at least one data cell which represents data stored in the cell). The routine then replaces the data in the first data cell with the new data from the write request, and removes all other data cells in the data list. The other data cells are removed because, when there is not a pending read, only the newly written data needs to be saved. Since read requests cannot pass write requests in the illustrated embodiment, there is no need to save the previous data in the first data cell (which represents an earlier write request). Any read request which occurs subsequently would be satisfied after the current write request overwrites any previous data in the memory location, so the previous data could not be accurately returned.

After performing step 255 to create a new address cell, or if step 260 determines that there is a pending read request for this address, the routine continues to step 265 where it creates a new data cell, stores the data from the write request in the new cell, and appends the new data cell to the end of the data list for this address cell. If the address cell was newly created, then the new data cell becomes the first data cell in the data list for the address cell. If the address cell was not newly created, the performance of this step will result in at least two data cells being present in the data list. Multiple data cells indicate that multiple data may accurately be returned in response to the pending read request. For example, consider the situation where the Request Tracker routine receives a request to write value 1 to memory location X followed by a request to read the data stored in memory location X. If a request to write value 2 to the same memory location is received before the read request is satisfied, then the data that is later returned in satisfaction of the read request could accurately be either of the values 1 or 2. This is true because the second write request (corresponding to the value 2) could be satisfied before the read request is satisfied, resulting in memory location X containing the value 2 before the read request is satisfied by reading the contents of the memory location. Thus, before the second write request is received, the data structure would have only one data cell that held the value of 1, and it would reflect that a read request was pending. When the second write request is received, another data cell would be created that held the value of 2. The existence of both data cells reflects the fact that the satisfaction of the read request could accurately return either 1 or 2. After completing step 265 or 270, the routine continues to step 275 where it determines if there are more indications of requests to receive. If so, the routine loops back to step 215 to receive another indication of a request, and if not the routine ends at step 280.

If step 220 determines that the indicated request is a read request rather than a write request, the routine continues to step 225 where the address list is searched for the read address. If it is determined in step 230 that the address is a new address, the routine continues to step 235 and asserts an error (reflecting that it is an error to read a memory location before data has been stored there). If it is determined in step 230 that the address is not new, the routine continues to step 240 where it updates the data list and address cell for this address to reflect that the read request is pending. The data structure can reflect that a read request is pending in a variety of ways. For example, the address cell and/or data cells could have flags that can be set as an indication of a pending read request, and that could be unset when the read request is satisfied. Alternatively, a special type of data cell could be created and inserted in the data list to reflect a pending read request. After performing either step 235 or 240, the routine continues to step 275 to determine if there are more indications of requests to receive. For a more detailed discussion of the creation and use of a data structure, see FIGS. 4A–4N and the accompanying text.

Those skilled in the art will appreciate that other methods for tracking requests are available. In particular, other types of data structures than a linked list can be used, such as hash tables, arrays, objects in an object-oriented system, etc. In addition, the routine and data structure could be modified to process read requests which can pass write requests, or could include a mechanism such as time stamping or tracking the number of write requests in order to determine if data returned in response to a read request lacks sufficient accuracy because it exceeds some established threshold.

Figure 3A:
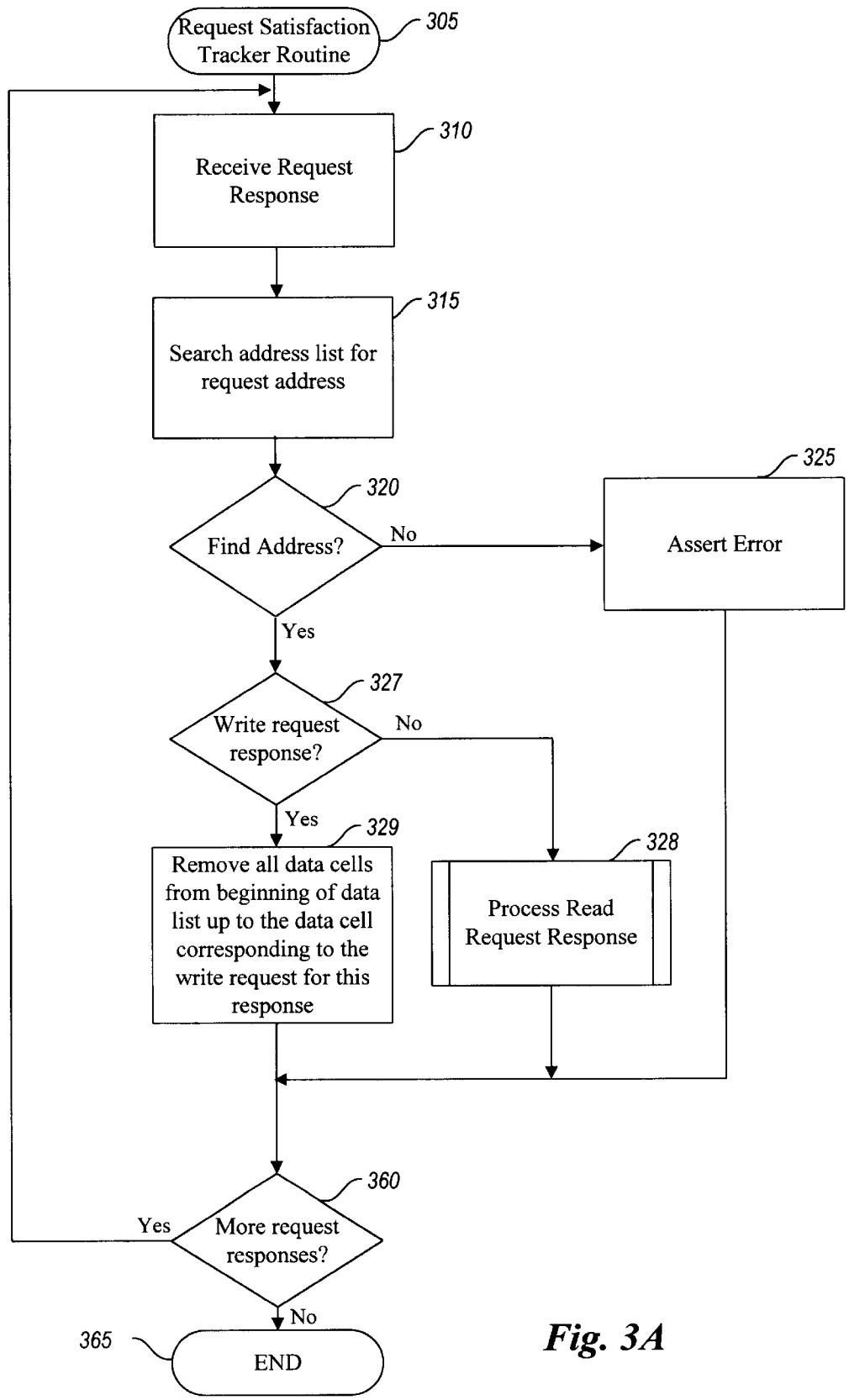
FIGS. 3A and 3B are a flow diagram of an implementation of the Request Satisfaction Tracker routine.
Figure 3B:
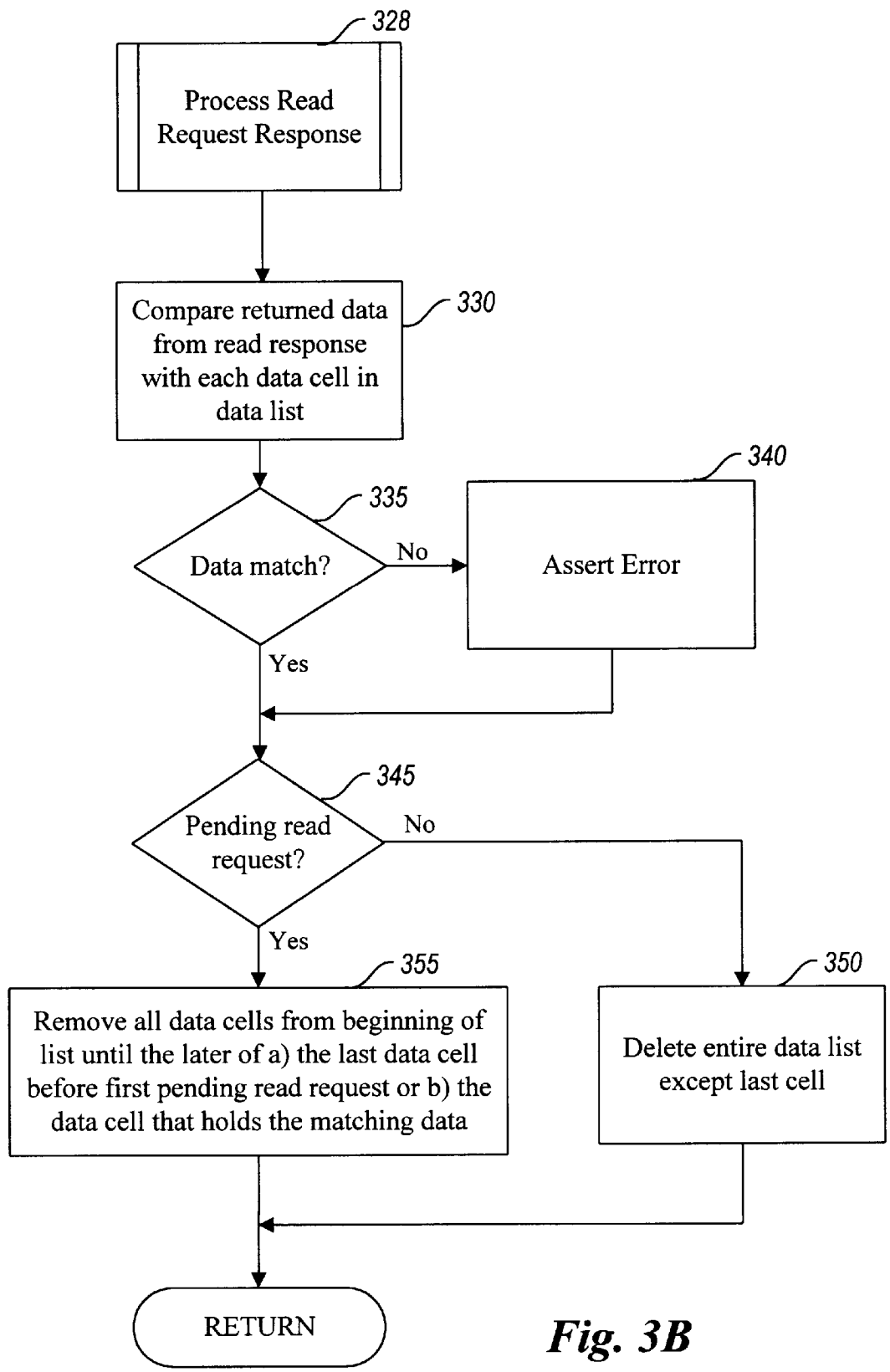

FIGS. 3A and 3B are a flow diagram for an implementation of the Request Satisfaction Tracker routine 305. The routine monitors responses to data requests that have been satisfied, modifies the data structure to reflect the responses, and compares returned data from read responses to the data stored in the data structure. If the returned data does not satisfy the conditions for sufficient accuracy, then the routine asserts an error.

The routine begins at step 310 where it receives an indication of a response to a data request. The routine continues to step 315 where it searches the data structure address list for the address corresponding to the response. In step 320 the routine determines if the address was found, and if not the routine asserts an error in step 325. If the address is found, the routine continues to step 327 to determine if the response is for a read request or a write request. If it is for a write request, the routine continues to step 329 where it retrieves the data list for the address cell and removes all of the data cells from the list before the data cell corresponding to the write. This is done because after the write request is satisfied, earlier data written to the memory location will be overwritten and is no longer accurate if it is returned.

If it is determined in step 327 that the response is for a read request, the routine continues to step 328 to invoke the Process Read Request Response subroutine. The subroutine is displayed on FIG. 3B, and it begins in step 330 where it compares the returned data to the data stored in each data cell in the data list for the address. In step 335 the subroutine determines if there is a match between the returned data and the data in a data cell. If it is determined in step 335 that there is no match, the subroutine continues to step 340 to assert an error (since the returned data does not match the data in the data list, the returned data is not accurate). After step 340, or if it is determined that there is a match in step 335, the subroutine continues to step 345 to determine if there is a pending read request. If it is determined in step 345 that there is not a pending read request, the subroutine continues to step 350 where it deletes the entire data list for this address except for the last data cell (which corresponds to the last data written to the memory address). This is because the only possibly accurate data for a later read is from the last write request.

If there was a pending read request in step 345, the subroutine continues to step 355 where it removes all data cells that are no longer accurate for the next pending read request. Since reads cannot pass writes in the illustrated example, the earliest write request whose data can accurately be returned for the next pending read request is the last write which occurred before the read request. Thus, it is always safe to remove all data cells from the beginning of the data list until the last data cell before the next pending read request. In this case, the new first data cell will correspond to the last write which occurred before the next pending read request. However, if a write which occurred after the read request has passed the read request, then that later write request will overwrite the value from the earlier write request before it can be read by the read request. Thus, if the data cell which matches the returned data in step 335 is after the last data cell before the next pending read request (which indicates that a later write has passed the read), all of the data cells will be removed from the beginning of the data lit until the matching data cell. This ensures that the new first data cell will correspond to a possibly accurate value. After step 355 or step 350, the subroutine returns.

After step 328, step 329, or step 325, the routine continues to step 360 to determine if there are more indications of request responses to receive. If so, the routine loops back to step 310 to receive an indication of the next request response, and if not the routine ends at step 365. Those skilled in the art will appreciate that other mechanisms can be used to verify the accuracy and responses received for read requests.

Figure 4A:
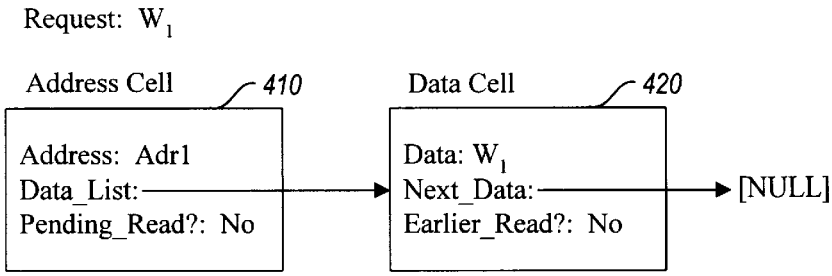
FIGS. 4A–4N are diagrams illustrating a data structure used for verifying the accuracy of stored data.
Figure 4B:
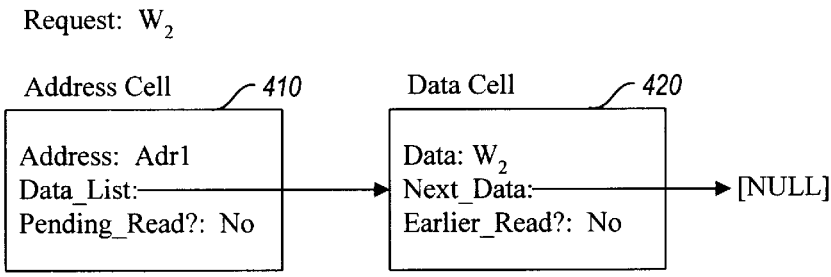
Figure 4C:
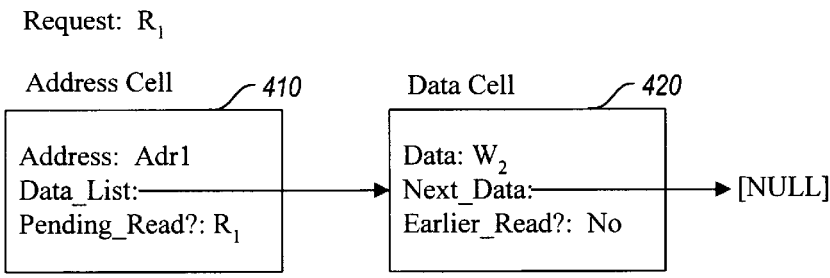
Figure 4D:
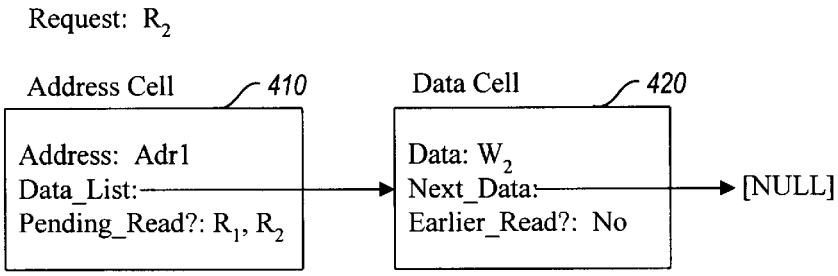
Figure 4E:
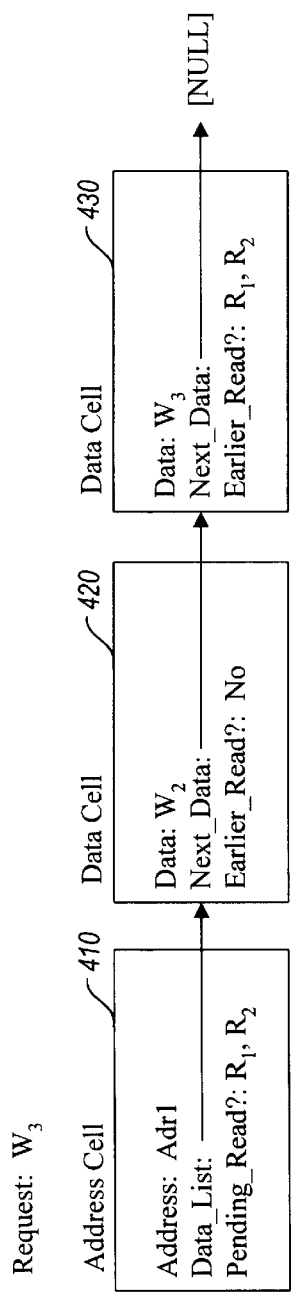
Figure 4F:
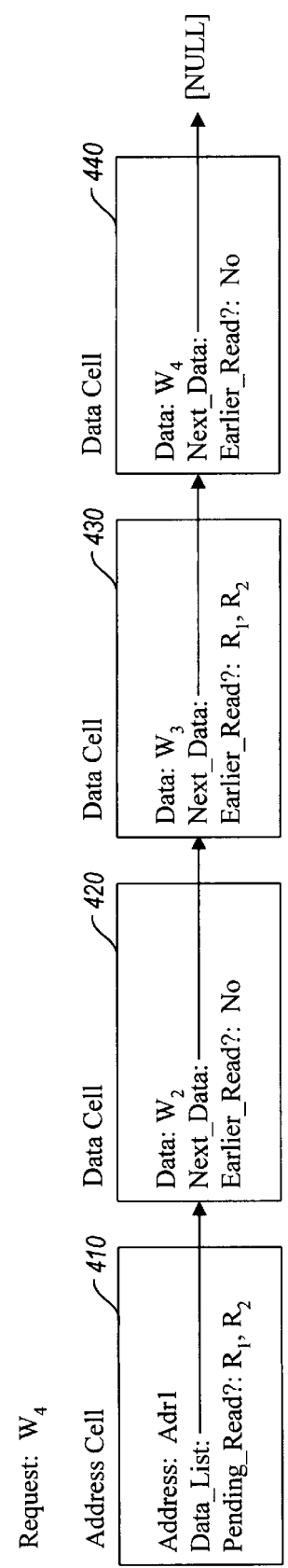
Figure 4G:
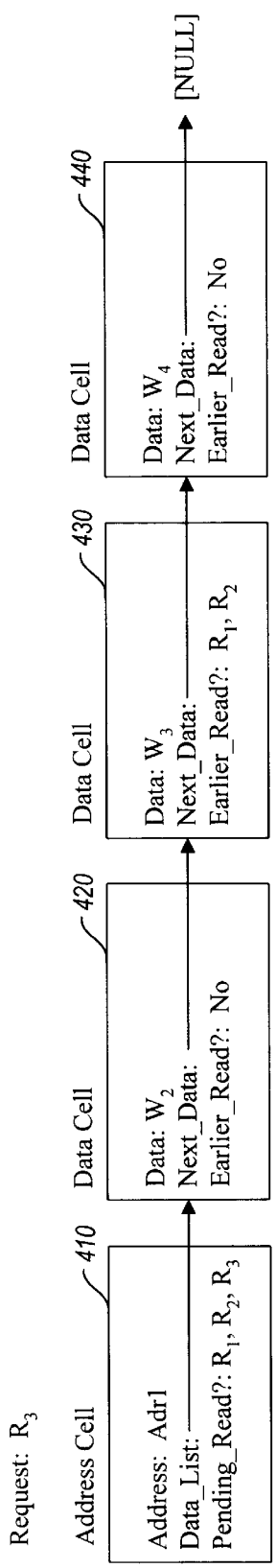
Figure 4H:
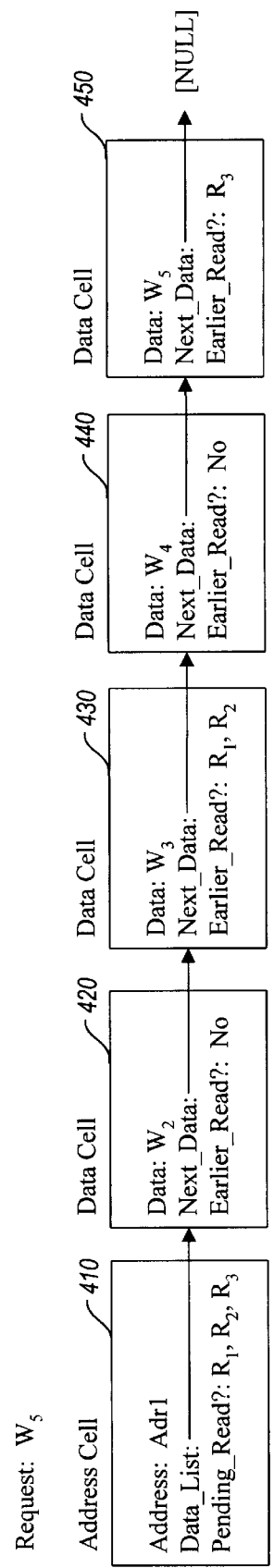
Figure 4I:
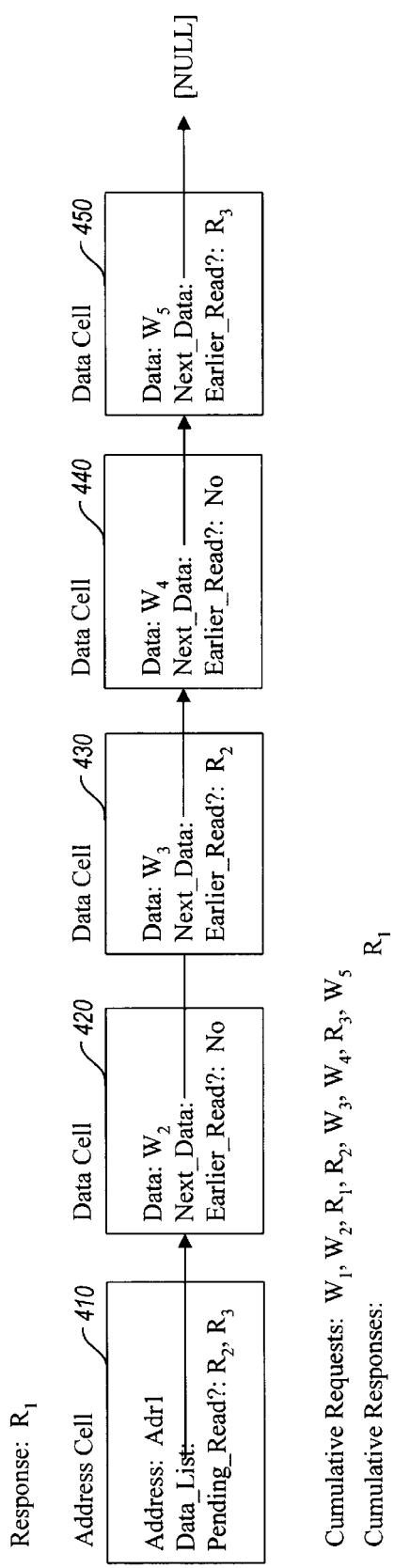
Figure 4J:
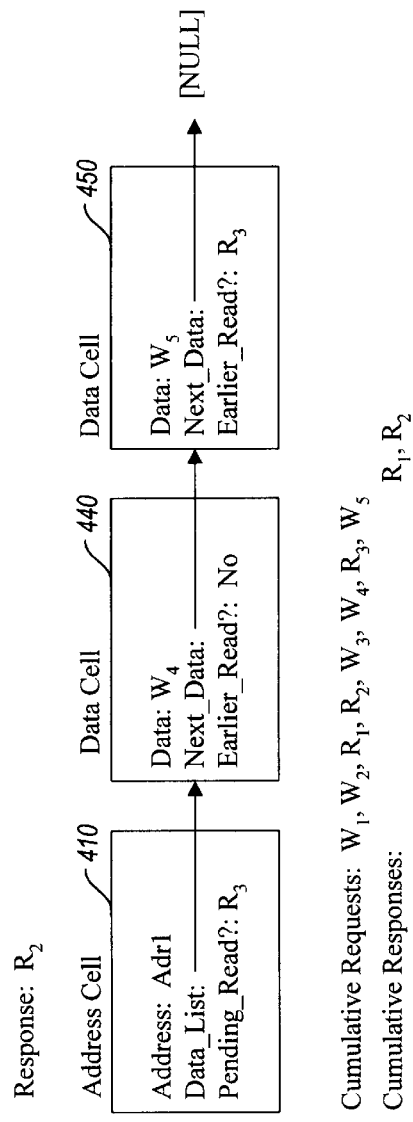
Figure 4K:
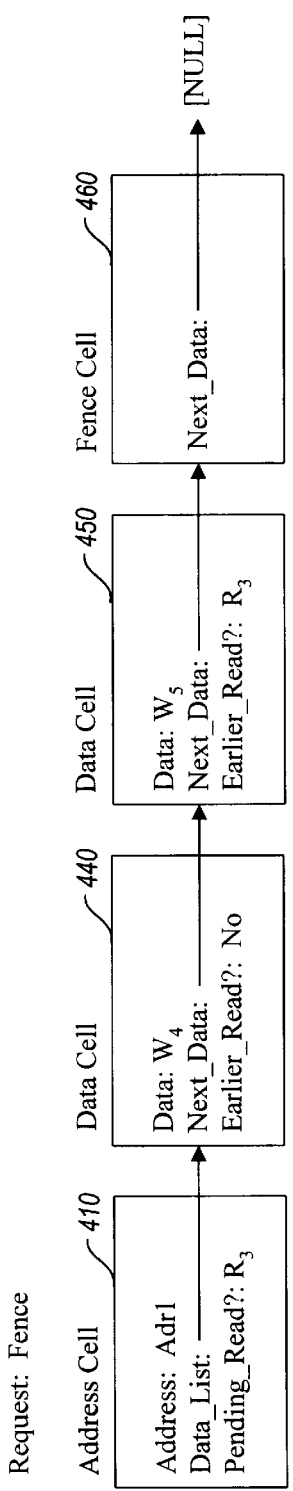
Figure 4L:
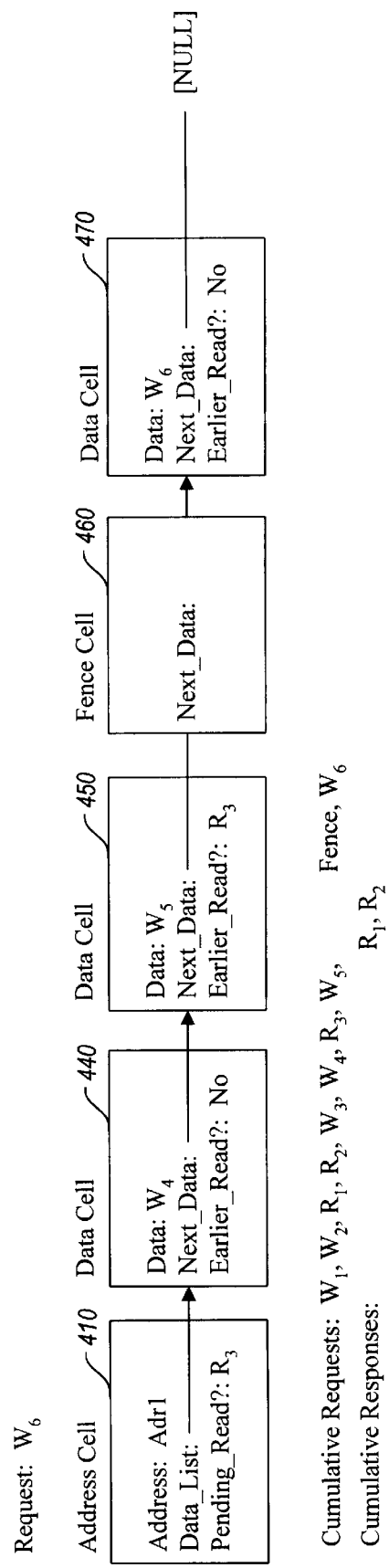
Figure 4M:
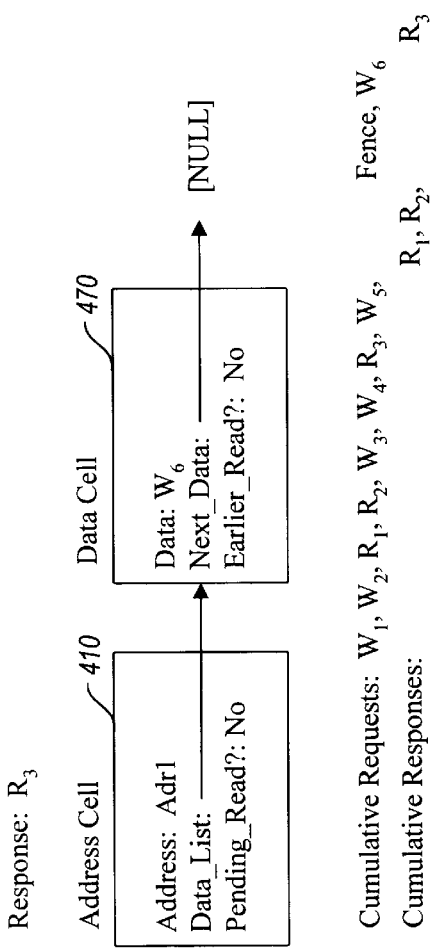
Figure 4N:
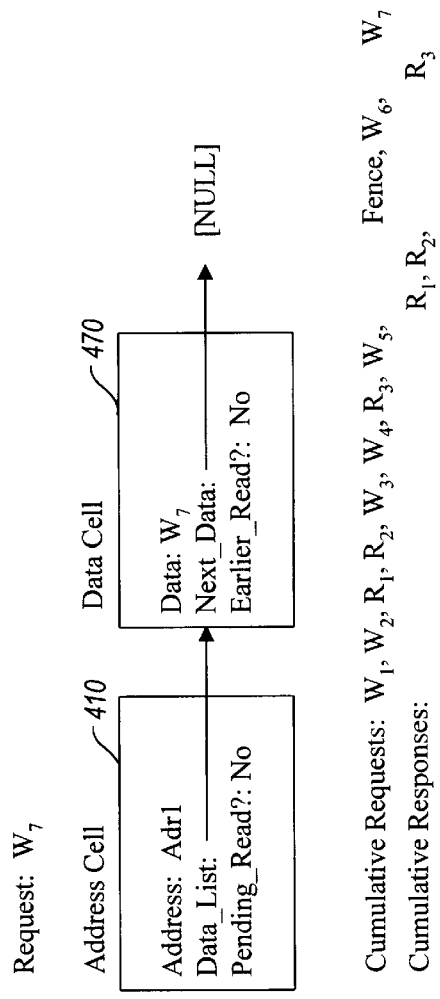

FIGS. 4A–4N illustrate the creation and modification of an address cell and various data cells in response to a series of read and write requests. The address cell represents a particular data storage location, in this case a memory location with a unique memory address. Data cells in the data list for the address cell represent write requests to that location. Those skilled in the art will appreciate that the address cell shown in this illustrated embodiment can be one in a series of linked address cells, and that other types of request data structures can be used to represent a data storage location. This data structure is shown for illustrative purposes only, and does not limit the scope of the present invention. FIG. 4A illustrates that request W1 was received by the Request Tracker routine, corresponding to a write request to store the value W1 in a memory location with an address of ADR1. The figure represents the data structure after it is modified to represent the write request, and it includes address cell 410 and data cell 420. Since an address cell for address ADR1 did not previously exist, the Request Tracker routine creates address cell 410. Address cells include data slots named "Address," "Data_List," and "Pending_Read?". The Address slot holds the memory address that is represented by the cell, the Data_List slot points to the first data cell in the data list for the address cell, and the Pending_Read? slot indicates if there are currently any pending read requests for the memory address. The Address slot in address cell 410 is set to the value of ADR1 and the Pending_Read? slot in address cell 410 is set to the value of "no". Just after address cell 410 is created, data cell 420 is created to correspond to write request W1 and value W1. Data cells include slots "Data," "Next_Data," and "Earlier_Read?". The Data slot holds the data to be stored by the write request which the data cell represents, the Next_Data slot points to the next data cell in the data list for the address cell, and the Earlier_Read? slot indicates pending read requests which were received before the current write request but after the most recent prior write request. The Data slot in data cell 420 is set to the value W1, the Next_Data slot receives a null pointer (indicating there are no more data cells), and the Earlier_Read? slot receives a value of "no." In addition, the Data_List slot of address cell 410 is set to point to data cell 420. Finally, the Cumulative Requests list in FIG. 4A illustrates that request W1 is the first request received. All subsequent requests illustrated in FIGS. 4B–4N will also go to memory address ADR1, and will thus use address cell 410.

FIG. 4B illustrates the data structure after a subsequent W2 request is received, corresponding to a write request to write value W2 to memory address ADR1. FIG. 4B includes address cell 410 and data cell 420, but the Data slot in data cell 420 has been modified to have the value of W2. Thus, data cell 420 now represents the write request W2 and value W2, and the write request W1 is no longer represented. In addition, the Cumulative Requests list shows that requests W1 and W2 have been received. Write request W1 is no longer being represented because value W1 is no longer a possibly accurate response to a later read request (in the illustrated example, read requests cannot pass write requests, and write requests are processed in the order received). Thus, write request W2 must be performed after write request W1 but before any later read request, and since memory location ADR1 can only store one value, value W2 will have replaced value W1 at memory address ADR1 before any read request could access the W1 value.

FIG. 4C corresponds to the receipt of read request R1, and includes address cell 410 and data cell 420. Read request R1 is the first received request to access the contents of memory address ADR1. Since request R1 has not yet been satisfied, the Pending_Read? slot at address cell 410 is modified to indicate that request R1 is pending. The Cumulative Requests list indicates that requests W1, W2 and R1 have been received. Those skilled in the art will appreciate that read requests could be represented in other ways, such as with a data cell in the data list.

FIG. 4D corresponds to the receipt of read request R2, and includes address cell 410 and data cell 420. Since neither of the read requests has yet been satisfied, the Pending_Read? slot of address cell 410 is modified to include both R1 and R2. The Cumulative Requests list indicates that requests W1, W2, R1 and R2 have been received.

FIG. 4E corresponds to the receipt of write request W3, indicating a request to write value W3 to memory address ADR1. FIG. 4E includes address cell 410 and data cells 420 and 430. Since at least one earlier read request is pending, data cell 430 is created to represent write request W3 rather than replacing the data in data cell 420 as was done for write request W2. The value W2 must still be represented because it is an accurate response for a pending read request, in this case for both R1 and R1. W2 is still accurate because one or both of the read requests may be satisfied before write request W3 is satisfied, and if so, memory address ADR1 will still contain the value W2. The Next_Data slot of data cell 420 is updated to point to new data cell 430, and the Next_Data slot of data cell 430 contains a null pointer. The Data slot of data cell 430 contains the value W3, and the Earlier_Read? slot of data cell 430 includes references to read requests R1 and R2. Thus, data cells 420 and 430 indicate that read requests R1 and R2 occurred after write request W2 but before write request W3, and that values W2 and W3 are both accurate data that can be returned in response to the satisfaction of read requests R1 and R2. The Cumulative Requests list in FIG. 4E indicates that the current requests have been received in the order W1, W2, R1, R2, and W3.

FIG. 4F corresponds to the receipt of write request W4, indicating a request to store value W4 to memory address ADR1. FIG. 4F includes address cell 410, data cell 420, data cell 430, and data cell 440. Data cell 440 is created to represent value W4 since earlier read requests R1 and R2 are pending, with the Data slot of data cell 440 set to contain the value W4. Data cells 420, 430 and 440 indicate that values W2, W3 and W4 are all accurate responses that can now be returned in response to the satisfaction of read requests R1 and R2. The Next_Data slot of data cell 430 is updated to point to data cell 440, and the Next_Data slot of data cell 440 contains the null pointer. The Earlier_Read? slot of data cell 440 contains the value "no" because there are no pending read requests which occurred between the previous write request W3 and the current write request W4. The Cumulative Request list indicates that the requests to date include W1, W2, R1, R2, W3, and W4.

FIG. 4G corresponds to the receipt of read request R3, indicating the third read request for the current contents of memory address ADR1. FIG. 4G includes address cell 410 and data cells 420, 430 and 440. The Pending_Read? slot of address cell 410 has been updated to indicate that read requests R1, R2, and R3 are all pending. The Cumulative Requests list indicates that the requests include W1, W2, R1, R2, W3, W4, and R3.

FIG. 4H corresponds to the receipt of write request W5, indicating a request to store value W5 in memory address ADR1. As with earlier similar write requests, a new data cell 450 is created to represent value W5, thus indicating that value W5 is an accurate response for the pending read requests. The Data slot of data cell 450 contains the value W5, and the Earlier_Read? slot includes a reference to read request R3. The Next_Data slot of data cell 440 is updated to point to data cell 450, and the Next_Data slot of data cell 450 references the null pointer. The Cumulative Requests list indicates that the requests include W1, W2, R1, R2, W3, W4, R3, and W5.

FIG. 4I indicates that a response to read request R1 has been received by the Request Satisfaction Tracker. Given the assumptions of the illustrated embodiment, the accurate responses to a read request include the data from the write request before the read request and from all write requests after the read request until the read request is satisfied. The values in the data structure reflect the data from these write requests. Any of the currently represented values in the data structure are accurate for a response to a pending read request. By checking the current data structure, it can be determined that any of the values W2, W3, W4, or W5 are accurate values for the response, and thus have sufficient accuracy if they are the returned value. If the returned value is any other value, an error would be indicated. In the illustrated example, value W2 is returned. FIG. 4I includes address cell 410 and data cells 420, 430, 440, and 450. The Pending_Read? slot of address cell 410 has been updated to reference only read requests R2 and R3 (since read request R1 has now been satisfied and is no longer pending). Similarly, the Earlier_Read? slot of data cell 430 has been updated to reference only read request R2. Since no new request was received, the Cumulative Requests list remains the same as for FIG. 4H, and a Cumulative Responses list has been added to show when responses to requests occur relative to the requests. In addition, since all of the represented values remain accurate for a response to read request R2, all of the data cells remain on the data list.

FIG. 4J indicates that a response to read request R2 has been received by the Request Satisfaction Tracker. In a similar manner to the response for read request R1, the accurate return values for read request R2 include W2, W3, W4, and W5, and the data structure represents these values. If the actual returned value is not one of these four values, an error will be indicated. In the illustrated example, value W3 is returned. After the accuracy of the returned data has been verified, data cells 420 and 430 are removed and the Data_List slot of address cell 410 is updated to point to data cell 440. These two data cells are removed so that the data structure reflects the possible values for the next pending read request. Thus, after the receipt of a response to a read request, the data structure is modified. If there are no pending read requests, all data cells but the last data cell will be removed. Since there is a pending read request, that being read request R3, all data cells are removed from the beginning of the data list until, but not including, the last write request before read request R3. Thus, since data cell 440 corresponds to write request W4, which was the last write request before pending read request R3, all data cells before data cell 440 are received. The resulting data structure indicates that at the current time, the accurate values to a response to read request R3 would include only values W4 and W5. If the value W5 had been returned for read request R2, data cell 440 would also have been removed since W4 would no longer have been a possible accurate value for read request R3. Since no new requests have been received, the Cumulative Requests list remains the same as in FIG. 4H, but the Cumulative Responses list includes both R1 and R2. In addition, the Pending_Read? slot of address cell 410 has been updated to include only a reference to read request R3.

FIG. 4K corresponds to the receipt of a Fence request by the Request Tracker, and includes address cell 410, data cells 440 and 450, and fence cell 460. Fence cell 460 includes a data slot Next_Data which contains a null pointer, and the Next_Data slot of data cell 450 is updated to point to fence cell 460. In the illustrated example, subsequent write requests can be performed before earlier requests. However, many systems include the ability to issue and receive requests which act as barriers to any subsequent request, here referred to as Fence requests. Thus, any request made before a Fence request must be satisfied before any request made after the Fence can be satisfied. The presence of Fence requests will alter the meaning and use of the data structure. For example, if a Fence request and then a write request occur while a read request is pending, then two cells will be added to the data list. However, the value from the write request will not be an accurate value for the response to the read request because of the intervening Fence request. If there had not been a pending read request, then the Fence request could have been ignored since only the most recent write request is represented if there is not a pending read. Those skilled in the art will appreciate that other methods of representing Fence requests are possible. The Cumulative Request list for FIG. 4K indicates that the requests received include W1, W2, R1, R2, W3, W4, R3, W5, and Fence.

FIG. 4L corresponds to the receipt of write request W6 by the Request Tracker, indicating a request to store the value W6 in the memory address ADR1. FIG. 4L includes address cell 410, data cells 440, 450 and 470, and fence cell 460. Since a pending read request exists, data cell 470 is created to represent write request W6 rather than replacing the data in an existing data cell. The Data slot of data cell 470 contains the value W6, and the Earlier_Read? slot includes the value "no." In addition, the Next_Data slot of data cell 470 contains the null pointer, and the Next_Data slot of fence cell 460 is updated to point to data cell 470. The Cumulative Requests list indicates that requests W1, W2, R1, R2, W3, W4, R3, W5, Fence, and W6 have been received.

Figure DM indicates that a response to read request R3 has been received by the Request Satisfaction Tracker, with the data structure indicating that the accurate values for R3 include W4 and W5. Thus, even though write request W6 was issued prior to the satisfaction of read request R3, the Fence command prevents write request W6 from being performed before read request R3. Therefore, value W6 cannot be an accurate return value. Figure Dm includes address cell 410 and data cell 470. The Pending_Read? slot of address cell 410 has been updated to indicate "no" because no read requests remain which are pending, and the Data_List slot of address cell 410 has been updated to point to data cell 470. Thus, after the returned value for read request R3 has been checked, data cells 440 and 450 and fence cell 460 are removed because value W6 is the only accurate data for any subsequent read requests. Since no new requests were received, the Cumulative Requests list of FIG. 4M remains the same as in FIG. 4L, but the Cumulative Responses list includes R1, R2, and R3.

FIG. 4N indicates that the write request W7 has been received by the Request Tracker, and includes address cell 410 and data cell 470. The data slot of data cell 470 has been updated to replace the value W6 with the value W7. Since no read requests are pending, the most recent data cell is updated rather than creating a new data cell. The Cumulative Requests list indicates that the requests received include W1, W2, R1, R2, W3, W4, R3, W5, Fence, W6, and W7. This series of requests illustrates one possible method for maintaining a request data structure.

While rare, it is also possible for a system to receive responses that indicate when they are performed. If the Request Satisfaction Tracker receives such a response, the request data structure will be updated to indicate that data from earlier write requests are no longer accurate responses for pending read requests, because the satisfaction of the write request for which the response was received will overwrite any previous values in the represented data storage location. Thus, receiving responses to write requests will typically reduce the number of possible values which are accurate as a response to a pending read request.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for verifying accuracy of stored data, the computer system having a memory with a plurality of locations for storing data values, the computer system such that a request to write a data value to a memory location may be performed before an earlier request to read a data value stored in the memory location, the method comprising:

detecting a write request to write a first data value to a memory location;

modifying a data structure that represents possible data values stored in the memory location to indicate that the first data value is the only possible stored data value;

after detecting the write request, detecting a read request to read the data value stored in the memory location;

modifying the data structure to reflect the read request;

after detecting the read request and before receiving a response to the read request, detecting a plurality of write requests to write data values to the memory location;

modifying the data structure to indicate that the possible stored data values include the first data value and the data values of the detected plurality of write requests;

after detecting the plurality of write requests, receiving in response to the read request the data value stored in the memory location; and after receiving the stored data value,
comparing the received stored data value to the possible stored data values of the data structure;
when the received stored data value is a possible stored data value, indicating that the received stored data value is accurate;
when the received stored data value is not a possible stored data value, indicating that the received stored data value is not accurate; and
modifying the data structure to indicate that the only possible stored data value is a data value of the last detected write request.

2. The method of claim 1 performed to test the computer system during development of the computer system.

3. The method of claim 1 performed to test the memory during operation of the computer system.

4. The method of claim 1 including:

after modifying the data structure to indicate that the data value of the last detected write request is the only possible stored data value and before detecting a second read request to read the data value stored in the memory location, detecting another write request to write a data value to the memory location; and modifying the data structure to indicate that the data value written by the another write request is the only possible stored data value.

5. The method of claim 1 wherein the computer system includes a central processing unit, a subsystem for displaying data to a user, and a bus for transferring data and requests between the central processing unit and the subsystem, wherein the subsystem generates requests and the central processing unit receives the requests via the bus, and wherein the central processing unit responds to one of the plurality of write requests to write a data value by storing the data value in the memory location before responding to the read request.

6. A method for verifying accuracy of contents of one of a plurality of data storage locations, the method comprising:

detecting a first write request to store first data as the contents of the one of a plurality of data storage locations;

in response to detecting the first write request, recording that the contents of the one of a plurality of data storage locations can only be the first data;

detecting a read request for the contents of the one of a plurality of data storage locations, the read request occurring after the first write request;

detecting a second write request to store second data as the contents of the one of a plurality of data storage locations, the second write request occurring after the read request;

in response to detecting the second write request, recording that the contents of the one of a plurality of data storage locations can be either the first data or the second data;

detecting a response to the read request, the detected response occurring after the second write request and including data representing the contents of the one of a plurality of data storage locations;

in response to detecting the response to the read request and before indicating that the detected response is accurate, comparing the data of the detected response to the recorded contents;

indicating that the detected response is accurate if the data of the detected response is the second data;

creating a data structure in response to detecting the first write request, and storing data in the created data structure to record that the contents of the one of a plurality of data storage locations can only be the first data; and wherein a plurality of write requests are detected, each write request to store data as contents of one of a plurality of data storage locations, and creating a substructure for each of the plurality of data storage locations within the created data structure such that the created substructures represent the contents of the plurality of data storage locations.

7. A method for verifying accuracy of contents of a data storage location, the method comprising:

detecting a first write request to store first data as the contents of the data storage location;

in response to detecting the first write request, recording that the contents of the data storage location can only be the first data;

detecting a read request for the contents of the data storage location, the read request occurring after the first write request;

detecting a second write request to store second data as the contents of the data storage location, the second write request occurring after the read request;

in response to detecting the second write request, recording that the contents of the data storage location can be either the first data or the second data;

detecting a response to the read request, the detected response occurring after the second write request and including data representing the contents of the data storage location;

in response to detecting the response to the read request and before indicating that the detected response is accurate, comparing the data of the detected response to the recorded contents;

indicating that the detected response is accurate if the data of the detected response is the second data;

creating a data structure in response to detecting the first write request, and storing data in the created data structure to record that the contents of the data storage location can only be the first data; and for each detected write request to store a data as the contents of the data storage location, creating a substructure within the created data structure to represent the data.

8. The method of claim 7 wherein the data storage location is a memory location of the computer system able to store a single data as contents and wherein the requests are initiated by a video subsystem of the computer system.

9. The method of claim 8 further comprising:

detecting a second read request for the contents of the data storage location, the second read request occurring after the second write request;

detecting a response to the second read request including data representing the contents of the data storage location; and indicating that the detected response to the second read request is accurate if the data of the detected response to the second read request is the first data.

10. The method of claim 9 wherein when the data of the detected response to the read request is the second data, the detected response to the second read request is indicated to be inaccurate if the data of the detected response to the second read request is the first data.

11. The method of claim 9 wherein a third write request to store third data as the contents of the data storage location is detected, the third write request occurring after the second read request but before the response to the second read request is generated, and wherein the detected response to the second read request is indicated to be accurate if the data of the detected response to the second read request is the third data.

12. A method for verifying accuracy of contents of a data storage location, the method comprising:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

detecting a third write request to store third data as the contents of the data storage location, the third write request occurring after the second write request;

detecting a second read request for the contents of the data storage location, the second read request occurring after the third write request;

detecting a response to the second read request including data representing the contents of the data storage location; and indicating that the detected response to the second read request is inaccurate if the data of the detected response to the second read request is not the third data.

13. A method for verifying accuracy of contents of a data storage location, the method comprising:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

detecting a third write request to store third data as the contents of the data storage location, the third write request occurring after the second write request;

detecting a second read request for the contents of the data storage location, the second read request occurring after the third write request;

detecting a response to the second read request including data representing the contents of the data storage location; and when the data of the detected response to the second read request is the second data, indicating that the data is accurate.

14. A method for verifying accuracy of contents of a data storage location, the method comprising:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

detecting a fence request that occurred after the second write request but before the response to the read request is generated, the fence request to prevent requests that occur after the fence request to be performed before requests that occur before the fence request;

detecting a third write request to store third data as the contents of the data storage location, the third write request occurring after the fence request but before the response to the read request is generated; and when the data of the detected response to the read request is the third data, indicating an error.

15. A method for verifying accuracy of contents of a data storage location, the method comprising:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

for each detected request, determining if the detected request is allowed to be performed before other requests which occurred before the detected request; and tracking each detected request that is determined to be allowed to be performed before other requests which occurred before the detected request so that the performance of other requests can be determined to be accurate.

16. A method for verifying accuracy of contents of a data storage location, the method comprising:

detecting a read request for the contents of the data storage location;

detecting a write request to store data as the contents of the data storage location, the write request occurring after the read request;

detecting a response to the read request including the contents of the data storage location, the detected response occurring after the write request;

when the contents included in the detected response are equal to the data of the write request, indicating that the contents of the data storage location are accurate;

in response to detecting an initial write request to store a data as the contents of the data storage location, creating a data structure to represent that a plurality of data may be the contents of the data storage location and that the data of the initial write request is one of the plurality, the initial write request occurring before the read request; and in response to detecting the write request occurring after the read request, modifying the data structure to represent that the data of the write request occurring after the read request is one of the plurality, and wherein contents included in a detected response to a read request are determined to be accurate if the contents are equal to a data that is one of the plurality represented by the created data structure.

17. The method of claim 16 wherein the data storage location is in computer system memory, wherein the data is video data, and including the step of displaying the detected response when the contents of the data storage location are accurate.

18. The method of claim 16 wherein a plurality of write requests are detected, each write request of the plurality to store a data as the contents of the data storage location and occurring after the read request but before the response to the read request is generated, wherein the data structure is modified to represent that the data of each of the write requests of the plurality may be the contents of the data storage location, the representation accomplished by creating a substructure within the data structure for each of the data, and wherein when the contents included in the detected response are equal to any data for which a substructure is present in the data structure, indicating that the contents of the data storage location are accurate.

19. The method of claim 18 wherein a first write request stored data as the contents of the data storage location and the contents included in the detected response to the read request are the data from the first write request, and including the further steps of:

detecting a second read request for the contents of the data storage location, the second read request occurring after the read request;

detecting a response to the second read request including data representing the contents of the data storage location; and indicating an error if the data of the detected response to the second read request is from a write request that occurred before the first write request.

20. A computer system for displaying information to a user, comprising:

a data storage location having contents of stored data, the data storage location such that a request to store data as the data storage location contents may be satisfied before a prior request for the data storage location contents;

a data structure for representing the data storage location contents such that if a plurality of requests to store data as the data storage location contents are received after a request for the data storage location contents is received but before a response to the request for the data storage location contents is generated, the represented data storage location contents indicate that the data storage location contents may comprise any data for which a request to store the any data as the data storage location contents was one of the received plurality of requests; and a subsystem that generates requests for the data storage location contents, that receives the data storage location contents in response to a request for the data storage location contents, and that indicates the received data storage location contents are accurate when the received data storage location contents comprise data for which the represented data storage location contents indicate that the data storage location contents may comprise the data.

21. The computer system of claim 20 wherein the data structure is created in response to an initial request to store data as the data storage location contents and is updated in response to later requests to store data as the data storage location contents.

22. The computer system of claim 20 wherein the data structure is used only to test the computer system during development.

23. The computer system of claim 20 wherein the computer system includes a memory, wherein the data storage location is a memory location of the memory, and wherein the subsystem is a video card.

24. The computer system of claim 23 wherein the computer system includes a central processing unit that controls storage of data as the memory location contents, wherein the video card issues at least one of the plurality of requests using an Accelerated Graphics Port interface such that the central processing unit does not control storage of data for the issued at least one request, and wherein the received stored data is displayed to the user.

25. A computer-readable medium containing instructions for controlling a computer system to verify accuracy of contents of a data storage location, by:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

detecting a third write request to store third data as the contents of the data storage location, the third write request occurring after the second write request;

detecting a second read request for the contents of the data storage location, the second read request occurring after the third write request;

detecting a response to the second read request including data representing the contents of the data storage location; and indicating that the detected response to the second read request is inaccurate if the data of the detected response to the second read request is not the third data.

26. The computer-readable medium of claim 25 wherein the computer system is further controlled to perform the steps of:

in response to detecting the first write request, recording that the contents of the data storage location can only be the first data;

in response to detecting the second write request, recording that the contents of the data storage location can be either the first data or the second data; and in response to detecting the response to the read request and before indicating that the detected response is accurate, comparing the data of the detected response to the recorded contents.

27. The computer-readable medium of claim 26 wherein a data structure is created in response to detecting the first write request, and wherein recording that the contents of the data storage location can be data involves storing the data in the created data structure.

28. The computer-readable medium of claim 25 wherein the data storage location is in volatile memory of the computer system and is able to store a single data as contents, and wherein the requests are initiated by a video subsystem of the computer system.

29. The computer-readable medium of claim 28 wherein the video subsystem issues the second write request using an Accelerated Graphics Port interface such that the request is satisfied without a central processing unit of the computer system responding to the second write request.

30. The computer-readable medium of claim 25 wherein the steps are performed as a test of the computer system.

31. A computer-readable medium containing instructions for controlling a computer system to verify accuracy of contents of a data storage location, by:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

detecting a third write request to store third data as the contents of the data storage location, the third write request occurring after the second write request;

detecting a second read request for the contents of the data storage location, the second read request occurring after the third write request;

detecting a response to the second read request including data representing the contents of the data storage location; and when the data of the detected response to the second read request is the second data, indicating that the data is accurate.

32. A computer-readable medium containing instructions for controlling a computer system to verify accuracy of contents of a data storage location, by:

detecting a first write request to store first data as the contents of the data storage location;

detecting a read request for the contents of the data storage location, the read request occurring after the first write request;

detecting a second write request to store second data as the contents of the data storage location, the second write request occurring after the read request;

detecting a response to the read request, the detected response occurring after the second write request and including data representing the contents of the data storage location;

indicating that the detected response is accurate if the data of the detected response is the second data;

detecting a fence request that occurred after the second write request but before the response to the read request is generated, the fence request to prevent requests that occur after the fence request to be performed before requests that occur before the fence request;

detecting a third write request to store third data as the contents of the data storage location, the third write request occurring after the fence request but before the response to the read request is generated; and when the data of the detected response to the read request is the third data, indicating an error.

33. A computer-readable medium containing instructions for controlling a computer system to verify accuracy of contents of a data storage location, by performing the steps of:

detecting a read request for the contents of the data storage location;

detecting a write request to store data as the contents of the data storage location, the write request occurring after the read request;

detecting a response to the read request including the contents of the data storage location, the detected response occurring after the write request;

when the contents included in the detected response are equal to the data of the write request, indicating that the contents of the data storage location are accurate;

in response to detecting an initial write request to store a data as the contents of the data storage location, creating a data structure to represent that a plurality of data may be the contents of the data storage location and that the data of the initial write request is one of the plurality, the initial write request occurring before the read request; and in response to detecting the write request occurring after the read request, modifying the data structure to represent that the data of the write request occurring after the read request is one of the plurality, and wherein contents included in a detected response to a read request are determined to be accurate if the contents are equal to a data that is one of the plurality represented by the created data structure.

34. The computer-readable medium of claim 33 wherein a plurality of write requests are detected, each write request of the plurality to store a data as the contents of the data storage location and occurring after the read request but before the response to the read request is generated, wherein the data structure is modified to represent that the data of each of the write requests of the plurality may be the contents of the data storage location, the representation accomplished by creating a substructure within the data structure for each of the data, and wherein when the contents included in the detected response are equal to any data for which a substructure is present in the data structure, indicating that the contents of the data storage location are accurate.

35. The computer-readable medium of claim 34 wherein a first write request stored data as the contents of the data storage location and the contents included in the detected response to the read request are the data from the first write request, and wherein the computer system is controlled to perform the further steps of:

detecting a second read request for the contents of the data storage location, the second read request occurring after the read request;

detecting a response to the second read request including data representing the contents of the data storage location; and indicating an error if the data of the detected response to the second read request is from a write request that occurred before the first write request.

* * * * *

UNITED STATES PATENT AND TRADEMARK OFFICE
CERTIFICATE OF CORRECTION

PATENT NO. : 6,112,319
DATED : August 29, 2000
INVENTOR(S) : Christopher Paulson Page 1 of 1

It is certified that error appears in the above-identified patent and that said Letters Patent is hereby corrected as shown below:

Title page,
Inventor, "Christopher Paulson, Cottage Grove, Minn." should read -- Christopher Paulson, Fort Collins, Co. --

Signed and Sealed this

Twenty-ninth Day of January, 2002

Attest:

Attesting Officer

JAMES E. ROGAN
*Director of the United States Patent and Trademark Office*